United States Patent [19]

Wahl

[11] Patent Number: 4,475,669

[45] Date of Patent: Oct. 9, 1984

[54] NON-FLOODING BELT FEEDER

[75] Inventor: Richard C. Wahl, Essex Fells, N.J.

[73] Assignee: Vibra-Screw, Inc., Totowa, N.J.

[21] Appl. No.: 325,815

[22] Filed: Nov. 30, 1981

[51] Int. Cl.³ ............................................. G01G 11/12
[52] U.S. Cl. ...................................... 222/55; 198/821; 177/121; 222/415
[58] Field of Search .......................... 222/371, 55, 415; 198/821, 525, 836, 688, 698; 177/63, 64, 66, 121

[56] References Cited

U.S. PATENT DOCUMENTS 3,147,850  9/1964  Ronceray .................. 198/698 X
3,786,961  1/1974  Wahl et al. ..................... 177/121
4,109,784  8/1978  Hartmann ....................... 198/821

FOREIGN PATENT DOCUMENTS 1952700  4/1971  Fed. Rep. of Germany ...... 198/821
1081588  6/1954  France .............................. 198/821
1381042  1/1975  United Kingdom ............... 198/821

Primary Examiner—Stanley H. Tollberg
Attorney, Agent, or Firm—Leitner, Martin

[57] ABSTRACT

A continuous flow, non-flooding gravimetric belt feeder is disclosed which may be used to convey fluid-like particulate material. The feeder includes an endless belt having spaced, transversely mounted cleats. A lateral wall is provided adjacent each of the opposed sides of the cleats and extending between adjacent cleats, thereby preventing the fluid-like particulate material from flowing along the belt, and thereby enabling the feeder to discharge the material at a steady, pre-set rate.

12 Claims, 10 Drawing Figures

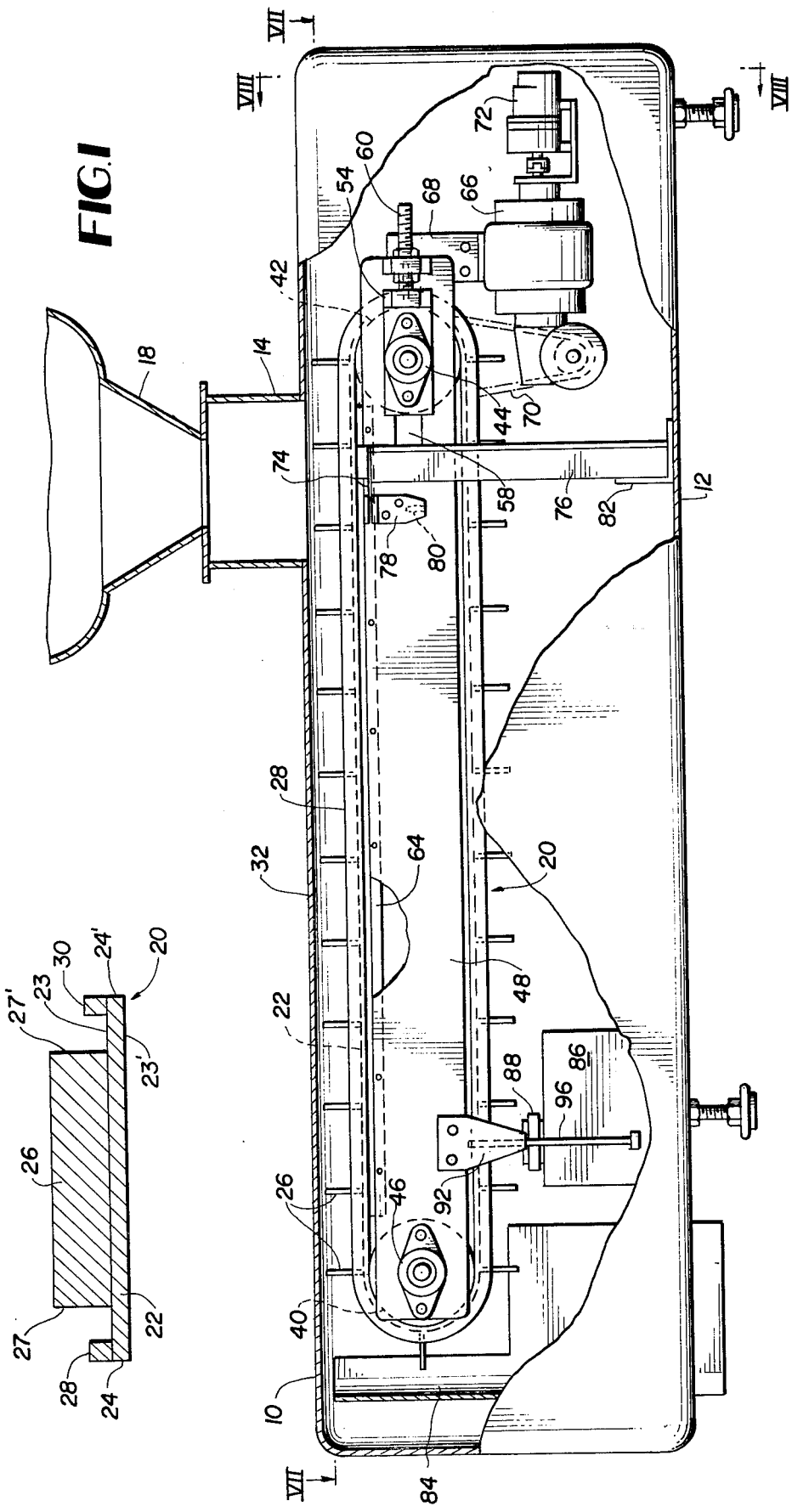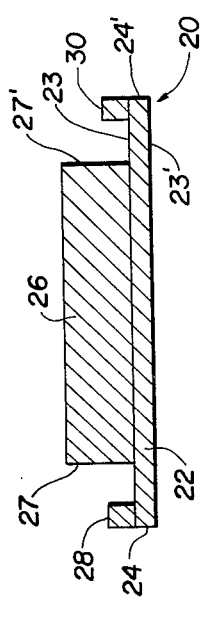

NON-FLOODING BELT FEEDER

BACKGROUND OF THE INVENTION

The invention disclosed herein pertains generally to material feeders and more particularly to a feeder for fluid-like particulate material.

Material feeders are used to provide a continuous flow of material into a process at a constant, predetermined feed rate. Gravimetric feeders discharge material into a process on a weigh/time basis, thereby automatically taking changes in the bulk density of the material into account. One class of gravimetric feeders are continuous flow, set rate feeders wherein material is discharged into a process in a continuous stream at a predetermined rate. Belt type feeders are one type of continuous flow, set rate feeders which can be equipped with an accurate weigh/totalizer feature U.S. Pat. No 3,786,961 to Wahl et al, which is hereby incorporated by reference, discloses a belt type, continuous flow, set rate feeder. The Wahl et al feeder includes a hopper having a spout which discharges material onto a horizontal, endless belt which is mounted between spaced pulleys. A variable speed motor drives one of the pulleys. The horizontal endless belt is pivotably supported at one end by a pair of leaf springs, the belt pivoting downwardly about a horizontal axis in response to the weight of the material on the belt. A load cell arranged beneath the belt at the opposite end of the belt senses the pivotal displacement of the belt, which displacement corresponds to the weight of the material on the belt. The load cell provides an output signal corresponding to the pivotal displacement of the belt to circuitry which regulates the speed of the motor in order to adjust the belt speed in accordance with the deviation of the material discharge rate from a pre-set rate.

Although the Wahl et al belt feeder disclosed in U.S. Pat. No. 3,786,961 works well with most particulate materials, this belt feeder, like all known conventional continuous flow, set rate belt feeders, may not work well with very fine, fluid-like or floodable particulate materials such as fly ash or pulverized coal. This is due to the fact that a flat belt is incapable of holding back a flood of material. That is, a flat belt is incapable of containing very fine particulate materials which tend to behave like a fluid and flow along the belt. Thus, using a flat belt to feed fluid-like or floodable particulate material at a steady, pre-set rate becomes very difficult if not impossible. One means for overcoming the difficulties associated with the belt feeding of fluid-like particulate material is to employ a screw prefeeder which accepts the material from a storage bin and deposits the material onto a weigh belt for weighing and totalizing. The screw flights of the screw prefeeder regulate the flow of material by holding back the flow of material. But of course, the addition of a screw prefeeder increases the cost of the material feeder system.

Other patents which disclose belt feeders include U.S. Pat. No. 3,834,474 to Knol, U.S. Pat. No. 3,884,313 to Engels, and U.S Pat. No. 3,979,055 to Fathauer et al. U.S. Pat. No. 3,834,474 to Knol discloses a metering and conveying apparatus which includes an endless belt having a plurality of spaced, transversely mounted scraper flights on the belt. As material is deposited onto the belt, the belt and the scraper flights apply a force to the material in the conveying direction in order to accelerate the material up to the speed of the conveyor belt. An equal and opposite reaction force is inherently applied to the conveyor by the material as the material is deposited onto the conveyor. This reaction force, which is proportional to the mass of the material deposited onto the belt, is sensed and is correlated with the speed of the conveyor belt by electronic processing apparatus to provide a quantity measurement. The Knol device is not capable of adequately feeding fluid-like particulate material at a pre-set rate despite the existence of the transversely mounted scraper flights on the belt, because the scraper flights are incapable of containing fluid-like particulate material. That is, fluid-like particulate material can readily flow over and around the scraper flights on the belt.

U.S. Pat. No. 3,884,313 to Engels discloses a feeding and measuring device for flowable solid materials. One embodiment of the Engels device includes a chain belt having a plurality of spaced, transversely mounted scrapers on the chains adapted to move the material along a partition and then along the bottom of a housing containing the device. While the scrapers of the Engels device are adequate for their intended purpose of moving or pushing material, they are incapable of containing fluid-like particulate material since such material can readily flow over and around the scrapers. Thus, the Engels device is inadequate to the task of feeding fluid-like particulate material at a continuous, pre-set rate.

U.S. Pat. No. 3,979,055 to Fathauer et al discloses a weighing conveyor system. The Fathauer et al conveyor system includes an upwardly inclined endless chain which is arranged between two parallel sidewalls of a framework. The endless chain includes spaced flights mounted transversely to the chain which flights, apparently, have the function of moving or pushing material up the incline and preventing backward slippage. The in-feed end of the framework is pivotably mounted while the opposite end of the framework is supported by an electronic load cell which senses the weight of the material on the conveyor system. The output of the load cell is combined with a speed related signal produced by a speed sensing assembly to form a combined rate output signal which is further processed to provide a record of a total weight of material signal and a rate weight signal. While the flights mounted on the inclined, endless chain of the Fathauer et al device are capable of pushing material up an incline, the flights are incapable of containing fluid-like particulate material because such material can readily flow over the flights and presumably flow around the flights through the spaces between the flights and the sidewalls of the framework. Thus, the Fathauer et al device is also not adequate to the task of conveying fluid-like particulate material at a continuous, pre-set rate.

While the prior art does disclose various types of belt feeders for conveying or feeding particulate material, the prior art does not disclose a belt feeder which is capable of conveying or feeding fluid-like particulate material at a continuous, pre-set rate, as is the case with the present invention.

SUMMARY OF THE INVENTION

The present invention is directed to a belt type feeder which is capable of containing fluid-like particulate material and preventing the flow of the particulate material along the belt, and thus capable of feeding the fluid-like particulate material at a continuous, pre-set rate.

Accordingly, a primary object of the present invention is to provide a continuous flow, set rate belt feeder for fluid-like particulate material.

Yet another object of the present invention is to provide a continuous flow, set rate belt feeder for fluid-like particulate material which is relatively simple and inexpensive and avoids the need for a screw prefeeder for the belt.

Thus, a continuous flow, set rate belt feeder for fluid-like particulate material, according to the present invention, includes a housing and a weigh belt system arranged within the housing, which weigh belt system includes a horizontally disposed endless belt mounted between spaced pulleys, which endless belt includes an upper surface. A variable speed motor is coupled to one of the pulleys. A plurality of spaced apart cleats is connected to, and extends transversely from, the upper surface of the endless belt, each of the cleats including opposed first and second sides. The present invention also includes means, within the housing, adjacent the opposed first and second sides of the cleats for forming lateral walls extending between adjacent cleats. Displacement means is also provided for measuring a displacement from the horizontal of at least a portion of the weight belt system and for producing an output signal corresponding to this displacement. Finally, a control means, responsive to the output signal, regulates the speed of the motor.

BRIEF DESCRIPTION OF THE DRAWINGS

Preferred embodiments of the present invention are described with reference to the accompanying drawings wherein like numerals denote like members, and wherein:

FIG. 1 is a side elevational view of a first embodiment of a continuous flow, set rate non-flooding belt feeder, according to the present invention, with a major portion of the housing side wall being broken away;

FIG. 3 is a cross-sectional view of the endless belt with transverse cleats used in the present invention;

DETAILED DESCRIPTION OF THE PREFERRED EMBODIMENT

Figure 2:
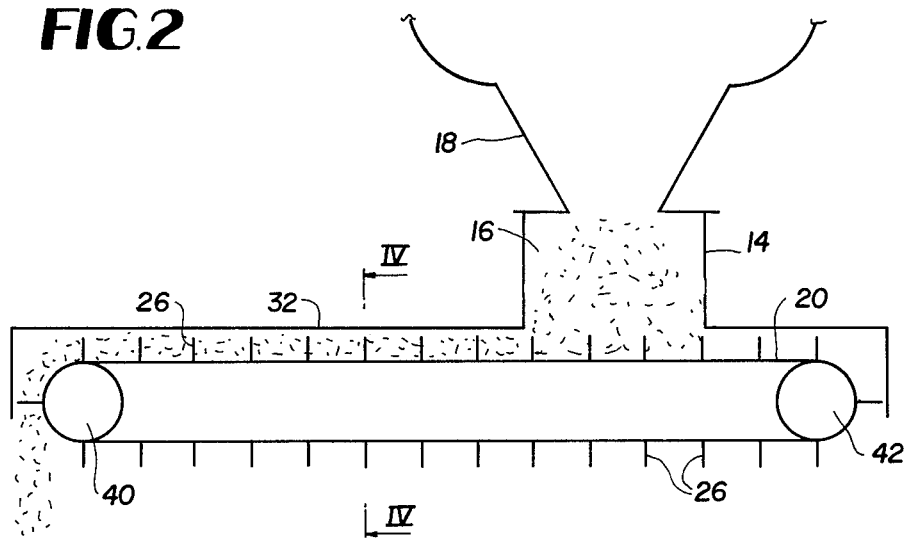
FIG. 2 is a side elevational view of the belt feeder shown in FIG. 1, showing only a portion of the housing and the endless belt with transverse cleats used in the present invention.

With reference to FIG. 1, a first preferred embodiment of a continuous flow, set rate non-flooding belt feeder suitable for feeding fluid-like particulate material, according to the present invention, includes a housing 10 which contains the belt feeder of the present invention, which housing is mounted on a base plate 12. The top wall of the housing includes a cylindrical trough reservoir 14. Arranged immediately above the reservoir 14 is a supply hopper 18 which supplies particulate material 16 to the reservoir 14 which in turn supplies the particulate material to an endless belt 20 within the housing 10.

With reference now to FIGS. 2-6, the endless belt 20 of the present invention is generally horizontally disposed within the housing 10 and passes around a pair of longitudinally spaced pulleys 40 and 42. The direction of rotation of the pulleys 40 and 42 is counterclockwise, as viewed in FIG. 2, and thus the conveying direction of the belt 20 is to the left, as viewed in FIG. 2.

The belt 20 includes a series of equally spaced apart cleats 26 connected to the belt 20 and disposed transversely with respect to the belt 20. As best seen in FIG. 3, the belt 20 includes a horizontal base portion 22 having upper and lower surfaces 23, 23' and opposed first and second sides 24, 24'. Each cleat 26 which is connected to, and extends transversely from, the upper surface 23 of the belt 20 and transverse to the direction of travel of the belt, is formed of a rectangular member having opposed first and second sides 27, 27'. The cleats 26 may be integrally formed with the horizontal base portion 22 of the belt 20 or, alternatively, the cleats 26 may be connected to the base portion 22 by suitable fastening or adhesive means. The cleats 26 do not transversely extend across the entire width of the base portion. Rather, continuous flanges 28 and 30 are connected to, and project vertically upwardly from, the upper surface 23 of the belt 20, the flanges 28 and 30 being arranged adjacent, respectively, the sides 24, 24' of the base portion 22 and spaced from the cleats 26. As is explained more fully below, the function of the cleats 26 is not to push material conveyed by the belt 20, but rather to compartmentalize the material. Furthermore, the function of the flanges 28 and 30 is to prevent material being transported by the belt 20 from falling over the sides of the belt 20 onto drive apparatus arranged beneath the belt.

Figure 4:
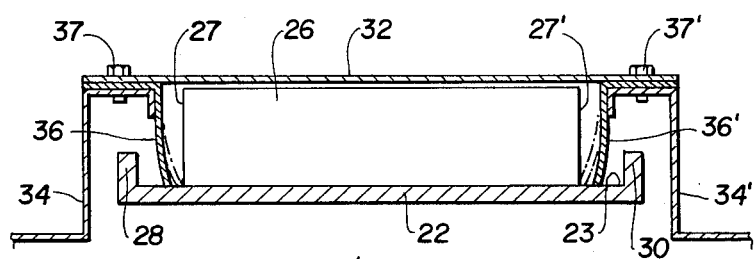
FIG. 4 is a sectional view taken along the line IV—IV of FIG. 2 showing a first embodiment of the wiper seals used with the endless belt of the present invention.

With reference to FIGS. 2 and 4, the housing 10 which contains the belt 20 includes an upper, horizontal wall 32 and vertical side walls 34 and 34'. The space between the upper wall 32 and the top of the cleats 26 is just sufficient to avoid frictional contact between the cleats 26 and the wall 32. Thus, fluid-like particulate material contained in a compartment defined by two adjacent cleats 26 would be substantially precluded from flowing over the top of one of the cleats into an adjacent compartment. In addition, the width of the housing 10, i.e. the distance between the side walls 34 and 34', is relatively small in the immediate vicinity of the belt 20, but is substantially greater just below the belt 20. That is, the width of the housing 10 in the immediate vicinity of the belt 20 is only slightly greater than the width of the belt 20 to minimize the extent of the spaces between the side walls 34 and 34' and the sides of the cleats 26 through which fluid-like particulate material could flow.

Figure 5:
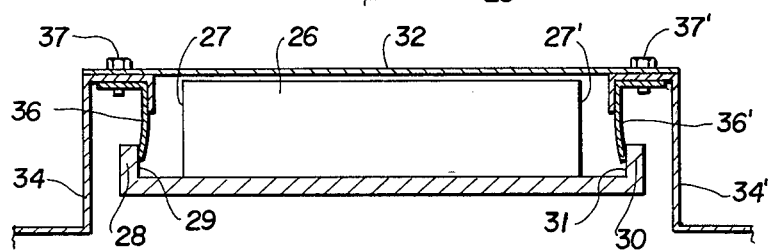
FIG. 5 is a sectional view similar to FIG. 4 showing a second embodiment of the wiper seals used with the endless belt of the present invention.
Figure 6:
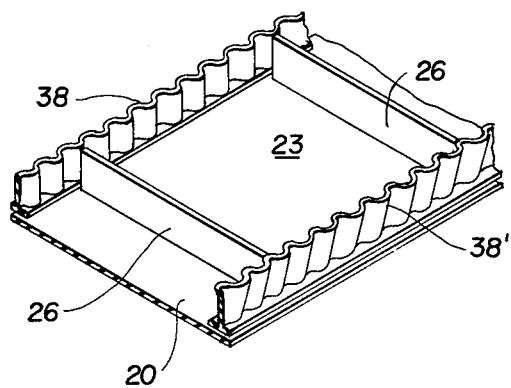
FIG. 6 is a perspective view of the corrugated side walls which may be used with the endless belt of the present invention in lieu of the wiper seals.

With references to FIGS. 4–6, the first embodiment of the present invention also includes three embodiments of lateral walls which, acting in cooperation with the cleats 26 and the housing 10, tend to compartmentalize particulate material being transported by the belt 20. With reference to FIG. 4, a first embodiment of the lateral walls includes elastomeric wiper seals 36 and 36' (shown as solid lines), which are connected by screws or bolts 37, 37' to the upper wall 32 and are suspended vertically downwardly into the interior of the housing 10. Each of the wiper seals 36 and 36' is suspended vertically downwardly from the wall 32 into one of the spaces between the vertical flanges 28, 30 and the cleats 26. Each of the wiper seals 36 and 36' is also in sealing engagement with the upper surface 23 of the belt 20. That is, each of the wiper seals 36 and 36' makes sealing contact with a relatively thin, longitudinal strip of the upper surface 23 of the belt 20, which strip may be located at any position between vertical flanges 28, 30 and the corresponding adjacent sides 27, 27' of the cleats 26. Thus sealing contact substantially precludes particulate material from flowing out over the sides of the belt 20. Furthermore, any particulate material that does happen to flow under the wiper seals 36, 36' is substantially precluded from flowing over the sides of the belt 20 by the flanges 28, 30. Because the height of the wiper seals 36, 36' is slightly greater than the distance between the upper wall 32 and the upper surface 23 of the belt 20, the wiper seals 36, 36' tend to become slightly bowed when making contact with the upper surface 23 of the belt 20, as is shown in FIG. 4.

With continued reference to FIG. 4, the wiper seals 36, 36' may be arranged so that each makes sealing contact with a longitudinal strip of the upper surface 23 of the belt 20 which includes the corners defined by the intersection of the cleats 26 and the upper surface 23. The wiper seals are shown in dotted lines in FIG. 4 when in this position.

With reference to FIG. 5, a second embodiment of the lateral walls used to compartmentalize the particulate material being transported by the belt 20 also includes elastomeric wipers 36, 36' suspended vertically downwardly by screws or bolts 37, 37' from the upper wall 32 of the housing 10. This second embodiment is generally similar to the first embodiment except that in the second embodiment each of the wipers 36, 36' sealingly engages an inner surface 29, 31 of one of the flanges 28, 30. The inner surface 29, 31 of a flange 28, 30 is that surface which faces the other flange. In this second embodiment, the height of the flanges 28, 30 is slightly greater than the height of the flanges 28, 30 in the first embodiment in order to more readily assure sealing contact between the flanges and the wiper seals, and to prevent any particulate material which has flowed under the wiper seals from falling over the sides of the belt 20. As with the first embodiment, the sealing contact between the wipers 36, 36' and the flanges 28, 30 substantially precludes particulate material from flowing out over the sides of the belt 20. The second embodiment has an advantage over the first embodiment in that the wipers exert no downward force on the belt 20.

With reference now to FIG. 6, a third embodiment of the lateral walls used to compartmentalize the particulate material being transported by the belt 20 does not include wiper seals, but rather includes corrugated side walls 38, 38' connected to, and projecting vertically upwardly from, the upper surface 23 of the belt 20. As can be readily appreciated from the drawing, the corrugated side wall 38 is arranged immediately adjacent, coextensive and in abutting relation with, the sides 27 of the cleats 26. Likewise the corrugated side wall 38' is arranged immediately adjacent, coextensive and in abutting relation with, the sides 27' of the cleats 26. The corrugated side walls, while adding additional weight and stiffness to the belt 20, avoid the need for wiper seals and effectively preclude particulate material from flowing out over the sides of the belt 20.

As should be now apparent, the cleats 26 acting in cooperation with the wiper seals 36, 36', or the currugated side walls 38, 38', and the housing 10 are effective in compartmentalizing the material being conveyed by the belt 20. That is, the material is substantially precluded from flowing over the tops of the cleats 26 by the presence of the upper wall 32 of the housing 10, and is substantially precluded from flowing over the sides of the belt 20 because of the seal formed between the wipers 36, 36' and the upper surface 23 of the belt 20 or, alternatively, because of the abutting relationship between the sides of the cleats 26 and the corrugated side walls 38, 38'. Thus, the cleats 26 in cooperation with the wipers 36, 36', or the corrugated side walls 38, 38', and the housing 10 act to substantially preclude fluid-like particulate material from flowing along the belt 20.

Figure 7:
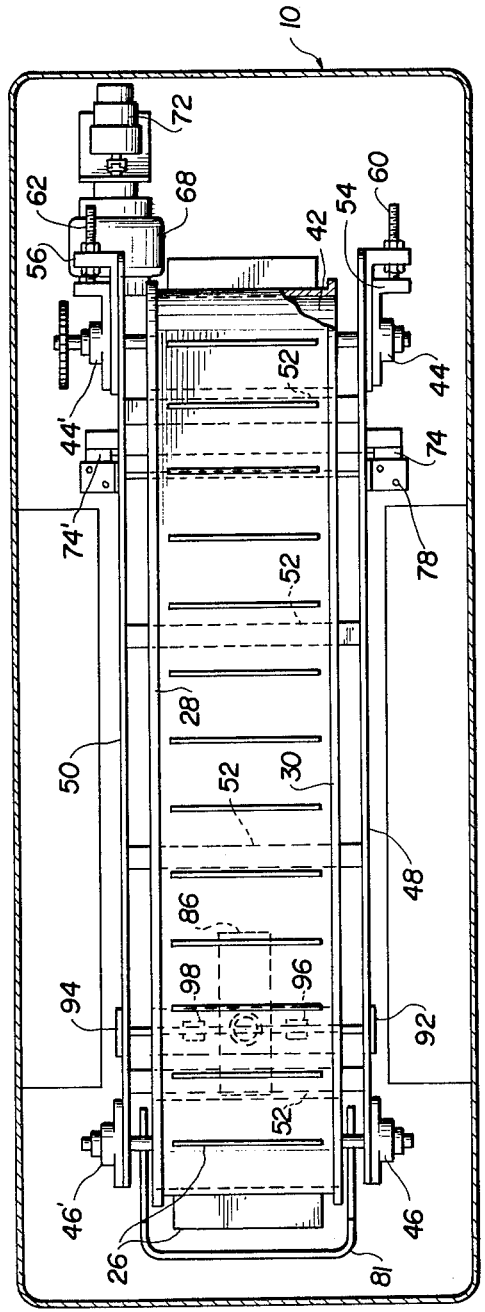
FIG. 7 a sectional view taken along the line VII—VII of FIG. 1 but with the supply hopper omitted.
Figure 8:
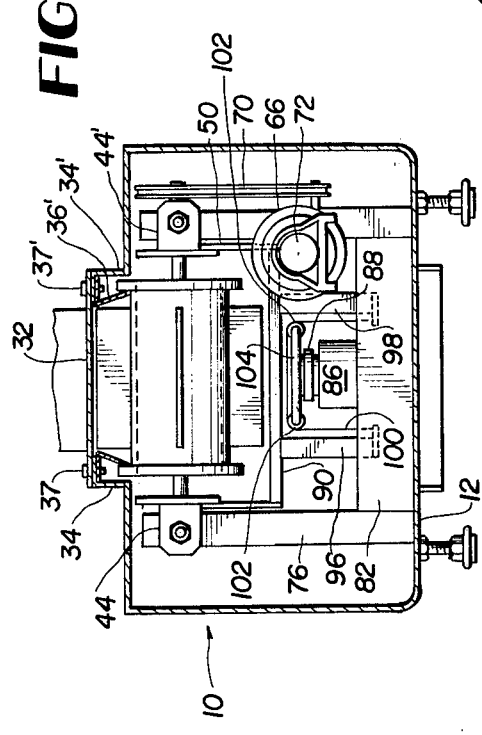
FIG. 8 is a sectional view taken along the line VIII—VIII of FIG. 1.

With reference now to FIGS. 1, 7 and 8, the pulleys 40 and 42 on which the endless belt 20 of the first preferred embodiment of a continuous flow, set rate, non-flooding belt feeder of the present invention is mounted have shafts rotatable in aligned sets of bearings 44, 44' and 46, 46'. These bearings are carried by a pair of vertically arranged frame members 48 and 50 secured together by a plurality of struts 52 to form a rigid structure. The bearings 44 and 44' are secured, respectively, to slide blocks 54 and 56 mounted for sliding movement along aligned slots formed in the frame members, the slot in the frame member 48 being visible in FIG. 1 and identified by the numeral 58. Adjusting screws 60 and 62 have ends threaded in holes formed in the slide blocks 54, 56, respectively. These screws also pass through threaded holes formed in associated blocks secured in fixed position on the frame members, the described arrangement providing means for adjusting the tension of the belt.

Underlying the upper portion of the belt 20 is a flat plate 64 (see FIG. 1) having downturned sides which are secured to the vertical frame members 48 and 50. This plate has a longitudinal length somewhat less than the spacing between the belt pulleys and supports the upper portion of the belt in a mono-planar disposition.

A d.c. motor 66 is mounted on a bracket 68 secured to and extending downwardly from the frame member 50. The motor 66 includes a gear reduction unit having an output shaft coupled to the pulley 42 by a chain drive 70 and cooperating sprocket wheels. A d.c. tachometer 72, supported on a bracket secured to the motor housing, has its armature connected to the motor drive shaft by a flexible coupling.

The described belt assembly is pivotally supported by a pair of leaf springs, 74, 74' lying in the plane containing the top portion of the endless belt 20. Referring to the leaf spring 74, one end portion of the spring is securely clamped between a pair of flat plates secured to the upper end of a post 76 which extends upwardly from the base plate 12. The other end portion of the leaf spring is securely clamped between a pair of flat plates secured to a bracket 78 which is bolted to the frame member 48. The other leaf spring 74' is similarly secured in place. A strut 80 (see FIG. 1) is welded to the bracket 78 and to the corresponding bracket associated with the other leaf spring 74'. The lower end of the post 76 is welded to an L-shaped bracket 82, which bracket extends across the base plate and is also welded to the corresponding post associated with the other leaf spring 74'. The upper portions of these posts are also connected together by a strut, not shown.

When the apparatus is in operation, fluid-like particulate material, for example, from the hopper 18 is deposited onto the endless belt 20 between the cleats 26 which compartmentalize the material in cooperation with the upper wall 32 of the housing 10 and the wipers 36, 36' or the corrugated side walls 38, 38', to prevent the material from flowing along the length of the belt. This material is then transported to the left (as viewed in FIG. 1) and drops through a chute 84 at the far end of the housing 10, which chute is secured to the base plate 10. In practice, the hopper 18 always provides an over supply of material into trough 14 to overfill the compartments defined by the cleats 26 over a variety of belt speeds. As the material is moved from the trough 14 by the endless belt 20 there is a leveling action produced by the vertical forward wall of the trough reservoir 14, i.e. the forward portion of the cylindrical wall of the trough reservoir 14, acting in cooperation with the upper, horizontal wall 32 of the housing 10 which is connected to, and extends from, the reservoir 14. Although trough 14 is described herein as a cylindrical member, it should be obvious that a polygonal shaped trough can be readily used.

The rigid structure associated with the leaf springs, described above, assures pivotal movement of the entire belt system about a horizontal axis lying within the unconfined portions of the leaf springs. The positioning of the leaf springs in the plane containing the top portion of the belt eliminates undesirable angular movement of the system due to the resistance force which may be developed on the belt as the material is conveyed from the reservoir 14. Pivotal movement of the entire belt is sensed by a load cell 86 having an address button 88. Positioned below the belt is a strut 90 having ends welded to a pair of support plates 92 and 94, which plates are secured to the frame members 48 and 50, respectively. A pair of rigid arms 96 and 98 are welded to the strut 90, the arms spanning the load cell, as seen in FIG. 8 to which specific reference now is made. A flexible wire 100 passes over a pair of pulley wheels 102 carried at the ends of an operating bar 104 which is secured to the address button 88. The ends of this wire are secured to the projecting end positions of tabs secured to the end of the arms 96 and 98. The described flexible coupling of the belt system to the address button prevents lateral forces from acting on the load cell. Consequently, pivotal movement of the belt system results in the application of forces to the load cell only in a direction along the longitudinal axis of the address button, which is highly desirable in a feeder which is to operate at highly accurate feed rates. The load cell is of conventional construction including a tare spring to adjust for the weight of the belt system. Preferably, the tare spring is adjusted so that the load cell is preloaded, thereby to prevent bouncing of the belt system and resulting in stability of operation.

All of the material carried on the belt 20 is sensed by the load cell 86 which produces a continuous output signal for controlling the speed of the motor 66 driving the belt 20, thereby to maintain a continuous discharge of the material at a pre-set rate, as will be described hereinbelow. In the case of fluid-like particulate material, the cleats 26 in combination with the wiper seals 36, 36' or the corrugated side walls 38, 38' and the housing 10 act to compartmentalize the material, thereby preventing the material from flowing along the belt 20, which flow would otherwise make it difficult, if not impossible, to discharge the material at a pre-set rate.

Figure 9:
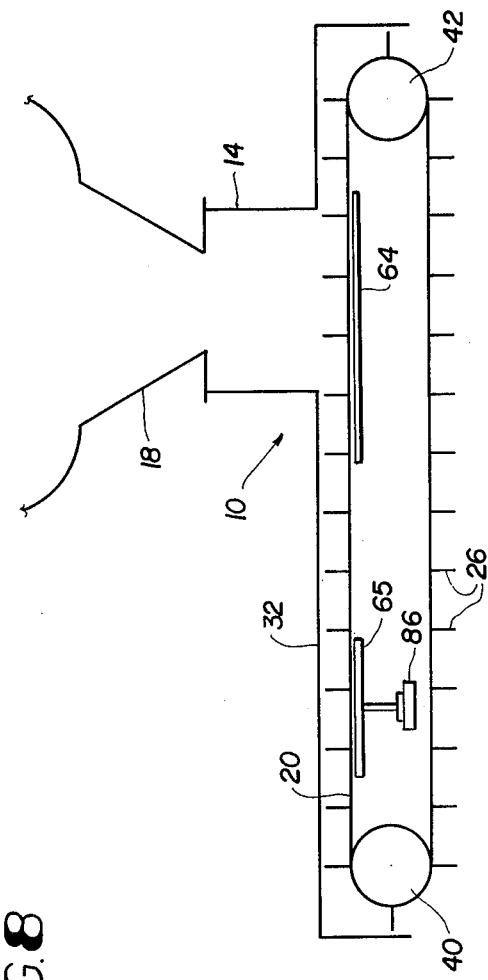
FIG. 9 is a side elevational view of a second embodiment of a continuous flow, set rate non-flooding belt feeder, according to the present invention.

With reference to FIG. 9, a second embodiment of a continuous flow, set rate, non-flooding belt feeder, according to the present invention, is generally similar to the first embodiment. That is, the second embodiment of the non-flooding belt feeder also includes a housing 10 which includes a trough reservoir 14. The housing 10 contains an endless belt 20 which is generally horizontally disposed and which passes around a pair of longitudinally spaced pulleys 40 and 42. The pulley 42 is driven by a variable speed motor. The belt 20 includes equally spaced apart cleats 26 extending transversely from the upper surface of the belt 20, as well as wiper seals in sealing engagement with the upper surface of the belt 20, or corrugated side walls in abutting relation with the sides of the cleats 26. The details have been deleted from FIG. 9 for sake of clarity.

A major distinction between the second embodiment and the first embodiment of the belt feeder of the present invention is that in the second embodiment, only a portion of the endless belt 20 is weighed. That is, in the second embodiment, the vertical displacement from a horizontal axis of only a portion of the endless belt 20 is sensed by one or more load cells. Thus, the second embodiment includes a flat plate 64 underlying the upper portion of the endless belt 20 which, unlike the first embodiment, underlies only a segment of the upper portion of the belt 20 directly beneath the reservoir 14. That is, the longitudinal extent of the flat plate 64 is approximately equal to the width of the reservoir 14 since only that segment of the upper portion of the belt 20 immediately beneath the reservoir 14 need be supported.

Arranged downstream from the plate 64 is a weigh deck platform 65 which supports a relatively short segment of the upper portion of the endless belt 20. The platform 65 undergoes a vertical displacement from a horizontal axis in response to the weight of the material on the short segment of the upper portion of the belt 20, which vertical displacement is sensed by one or more load cells 86 arranged beneath the platform 65. The one or more load cells 86 produce a combined, continuous output signal which is used to regulate the speed of the motor 66 driving the belt 20. As an alternative to using the weigh deck 65 to measure the weight of a short segment of the belt 20, a pair of idler rollers may be used in lieu of the weigh deck 65. The idler rollers, which would be mounted on a common axle, would be arranged immediately beneath the segment of the belt 20 to be supported. The vertical displacements of the opposite ends of the axle on which the idler rollers are mounted would be sensed by two load cells, each of which would be positioned beneath one end of the axle. The load cells would produce a combined, continuous output signal which would be used to regulate the speed of the motor 66 driving the belt 20.

Figure 10:
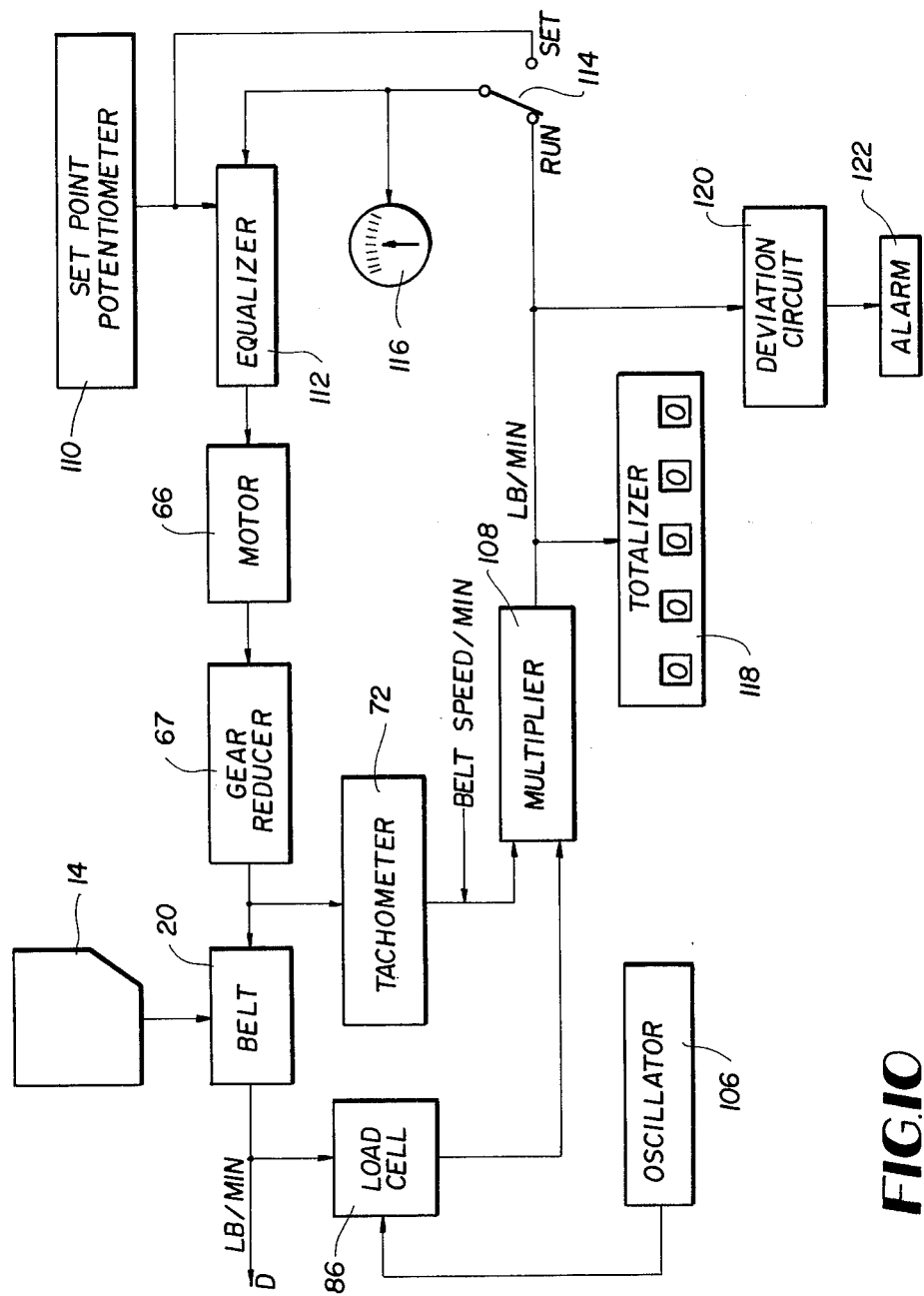
FIG. 10 is a block diagram of the control system of the present invention.

The continuous output signal produced by the one or more load cells 86 used in the first and second preferred embodiments of a continuous flow, set rate, non-flooding belt feeder, according to the present invention, is communicated to a control system which regulates the speed of the motor 66. A block diagram of the control system used with both embodiments of the present invention is shown in FIG. 10. However, the description of the control system which follows is with reference to the first embodiment. As shown in FIG. 10, material is initially deposited onto the belt 20 through the trough reservoir 14. The motor 66 drives the belt 20 through the gear reducer 67 and the material is discharged into process at the point D. The weight of the material on the belt 20 is sensed by the load cell 86 which may, for example, be a linear voltage differential transformer energized by an oscillator 106 operating at 2,500 Hz as shown in FIG. 10 or, alternatively, be of the strain gauge of hydraulic load cell. The load cell includes means to tare out the weigh belt mechanism and produces an output signal proportional only to the weight of the material on the belt. The tachometer 72 produces a voltage proportional to belt velocity. This voltage signal and that from the load cell are applied to a multiplier 108 which is a solid-state device and which multiplies the two applied voltage signals. The multiplier 108 operates on the principle of triangle averaging, using the mathematical relationship of quarter square multiplication, wherein one quarter of the difference of two squares equals the product of V (belt velocity)×W (material weight). The multiplier produces an output voltage proportional to the weight of the material delivered per unit of time and is used for comparison with the desired or set rate. The desired rate is established by a manually adjustable set point potentiometer 110 which applies a constant voltage of predetermined magnitude to an equalizer 112. When the manually operable switch 114 is closed to the SET position, the output voltage of the potentiometer is also applied to a meter 116 having a scale calibrated in pounds/minute, thereby providing a visual indication of the desired feed rate. When this switch is moved to the illustrated RUN position, the output voltage of the multiplier is applied to the meter 116 which now indicates the actual delivery rate.

The equalizer 112 senses the desired feed rate, as defined by the voltage signal from the potentiometer 110, and compares it to the feedback signal from the multiplier 108 which is proportional to the actual feed rate. The resultant error or difference signal is dynamically modified in the equalizer 112, which not only performs the subtractive function necessary for correction, but, also, is frequency or response-rate sensitive. The drive motor 66 completes the control loop through power amplification of the equalizer output, which is used to drive the gear reducer 67 in accordance with signal intelligence from the equalizer. A totalizer 118 integrates the information derived from the multiplier and provides a visual indication of the total material weight delivered by the system. A deviation circuit 120, settable for high and low limits about the set delivery rate, actuates an alarm 122 when unusual disturbances occur in the system. These disturbances might include, for example, an empty supply hopper.

The control system described above is capable of operating at an overall accuracy of ±0.5 to ±0.25 percent of the set rate at 2 (two) Sigma for most materials. Sigma, as used herein and as used in accuracy statements, refers to the standard deviation developed by repetitive sampling, and is defined by the formula:

$$\text{Sigma} = \sqrt{\Sigma(d^2)/N}$$

where
$d$ = individual deviations of repetitive samples, and
$N$ = the number of samples.

An accuracy of ±½ percent at 1 (one) Sigma indicates that approximately 65 percent of all sample weighments will be within ±½ percent of the mean or set rate. For an accuracy of ±½ percent at 2 (two) Sigma, approximately 95 percent of the sample weighments will be within ±½ percent of the set rate.

The present invention is advantageous because the transverse cleats on the endless belt of the present invention, in combination with the wiper seals, or corrugated side walls, and the housing of the present invention, produce a compartmentalization of fluid-like particulate material being conveyed by the present invention, thereby preventing the fluid-like particualte material from flowing along the endless belt, and thereby enabling the belt to discharge the material at a pre-set rate.

The principles, preferred embodiment and modes of operation of the present invention have been described in the foregoing specification. The invention which is intended to be protected herein, however, it not to be construed as limited to the particular forms disclosed, since these are to be regarded as illustrative rather than restrictive. Variations and changes may be made by those skilled in the art without departing from the spirit of the present invention.

What is claimed is:

1. Apparatus for feeding fluid-like particulate material, comprising:
   a housing which includes a generally horizontal wall;
   a weigh belt system, arranged within said housing, which weigh belt system includes a horizontally disposed endless belt mounted between spaced pulleys, and which endless belt includes an upper surface, spaced below and substantially parallel to said horizontal wall, and opposed first and second sides;
   a variable speed motor coupled to one of said pulleys;
   a plurality of spaced apart cleats connected to, and extending transversely from, the upper surface of said endless belt, each of which cleats includes opposed first and second sides, said endless belt spaced from the horizontal wall just sufficient to avoid frictional contact between the cleats and said horizontal wall such that the fluid-like particulate material is substantially prevented from overflowing said cleats and flowing along said endless belt;
   wall means for the belt, arranged within said housing, adjacent and coextensive with the opposed first and second sides of said cleats for compartmentalizing the fluid-like particulate material such that the fluid-like particulate material is contained on the endless belt and is substantially prevented from entering the housing from said belt;
   displacement means for measuring a displacement from the horizontal of at least a portion of said weigh belt system and for producing an output signal corresponding to said displacement; and
   control means, responsive to said output signal, for regulating the speed of said motor.

2. Apparatus in accordance with claim 1 wherein said means for compartmentalizing the fluid-like particulate material includes:

first and second corrugated walls connected to, and projecting vertically upwardly from, the upper surface of said endless belt, and which first and second corrugated walls abut, respectively and are coextensive with the first and second sides of said cleats.

3. Apparatus in accordance with claim 1, wherein said displacement means includes:

resilient support means for supporting said weigh belt system for pivotal displacement about a horizontal axis; and a transducer coupled to said weigh belt system, which transducer provides an output signal corresponding to the pivotal displacement of said weigh belt system.

4. Apparatus in accordance with claim 3 wherein said resilient support means includes a pair of leaf springs, which springs are arranged on either side of the weigh belt system and lie in a plane containing the top portion of said belt.

5. Apparatus in accordance with claim 3 wherein said transducer includes a load cell having an address button positioned beneath said weigh belt system.

6. Apparatus in accordance with claim 5 further comprising:

a pair of pulley wheels rotatably mounted on the end portions of a rigid bar secured to the address button;

a pair of arms secured to the weigh belt system and spanning the load cell; and a flexible member passing over said pulley wheels and having its ends secured to the free ends of said arms.

7. Apparatus in accordance with claim 1, wherein said displacement means includes:

support means for supporting a portion of said weigh belt system for vertical displacement from a horizontal axis; and at least one transducer coupled to said support means, which transducer provides an output signal corresponding to the vertical displacement of said portion of said weigh belt system.

8. Apparatus in accordance with claim 1 wherein said housing includes:

a reservoir arranged above said weigh belt system, which reservoir includes a vertical, forward wall, and the horizontal wall is connected to, and extends from said vertical forward wall.

9. Apparatus for feeding fluid-like particulate material, comprising:

a housing which includes a substantially horizontal wall;

an endless belt arranged within said housing, which endless belt is substantially horizontally disposed and mounted between spaced pulleys, and which endless belt includes an upper surface and opposed first and second sides;

a motor coupled to one of said pulleys;

a plurality of spaced apart cleats connected to, and extending transversely from, the upper surface of said endless belt, each of which cleats includes opposed first and second sides;

means, arranged within said housing, adjacent and at least coextensive with the opposed first and second sides of said cleats, for compartmentalizing the fluid-like particulate material between said endless belt and said housing and for substantially preventing the material from flowing off the sides of the belt; and said horizontal wall being arranged above said endless belt with the space between said horizontal wall and the upper surface of said endless belt being just sufficient to avoid frictional contact between said cleats and said horizontal wall thereby preventing said material from overflowing the cleats and flowing along said endless belt.

10. Apparatus in accordance with claim 9 wherein said means for compartmentalizing the fluid-like material includes:

first and second corrugated walls connected to, and projecting vertically upwardly from, the upper surface of said endless belt and abutting said first and second sides of said cleats, and the fluid-like particulate material is substantially prevented from flowing around the sides of the cleats by said corrugated walls in abutment therewith, 11. Apparatus in accordance with claim 9 wherein said housing further includes a reservoir above said endless belt, which reservoir includes a vertical, forward wall, said horizontal wall and the bottom of said vertical forward wall lying in the same horizontal plane.

12. Apparatus for feeding fluid-like particulate material, comprising:

a housing which includes a substantially horizontal wall;

an endless belt arranged within said housing, which endless belt is substantially horizontally disposed and mounted between spaced pulleys, and which endless belt includes an upper surface;

a motor coupled to one of said pulleys;

a plurality of spaced apart cleats connected to, and extending transversely from, the upper surface of said endless belt, each of which cleats includes opposed first and second sides;

lateral walls located within said housing, adjacent, abutting and coextensive with the opposed first and second sides of said cleats; said lateral walls for compartmentalizing the fluid-like particulate material on the belt between the cleats, and the horizontal wall and preventing the particulate material from flowing over the sides of the belt said horizontal wall being arranged above said endless belt with the space between said horizontal wall and the upper surface of said endless belt being just sufficient to avoid frictional contact between said cleats and said horizontal wall so that the fluid-like particulate material does not overflow the cleats, thereby substantially preventing said material from flowing along said endless belt.

* * * * *